(12) United States Patent
Rapp

(10) Patent No.: US 7,644,084 B2
(45) Date of Patent: *Jan. 5, 2010

(54) METHODS, COMPUTER SYSTEMS AND SOFTWARE APPLICATIONS FOR PROVIDING A CENTRAL LOCK SERVICE

(75) Inventor: Roman Rapp, Villeneuve Loubet (FR)

(73) Assignee: SAP AG, Walldorf (DE)

( * ) Notice: Subject to any disclaimer, the term of this patent is extended or adjusted under 35 U.S.C. 154(b) by 773 days.

This patent is subject to a terminal disclaimer.

(21) Appl. No.: 11/292,117

(22) Filed: Dec. 2, 2005

(65) Prior Publication Data
US 2006/0123004 A1   Jun. 8, 2006

Related U.S. Application Data

(60) Provisional application No. 60/632,540, filed on Dec. 3, 2004.

(30) Foreign Application Priority Data
Jan. 25, 2005   (EP)  ................................. 05100460

(51) Int. Cl.
G06F 7/00 (2006.01)
G06F 17/30 (2006.01)
(52) U.S. Cl. .............................. 707/8; 707/10; 711/147
(58) Field of Classification Search ........................ None
See application file for complete search history.

(56) References Cited

U.S. PATENT DOCUMENTS 4,716,528 A * 12/1987 Crus et al. ................. 710/200
5,119,490 A    6/1992 Kurose
5,327,556 A * 7/1994 Mohan et al. ................ 707/8
5,414,839 A    5/1995 Joshi
5,440,732 A    8/1995 Lomet et al.
5,485,607 A    1/1996 Lomet et al.

(Continued)

FOREIGN PATENT DOCUMENTS

EP           1 566 744 A1      8/2005

(Continued)

OTHER PUBLICATIONS

The SAP Lock Concept, (BC-CST-EQ), Release 4.6C, Publication of SAP, 2001.*

(Continued)

Primary Examiner—Khanh B Pham
Assistant Examiner—Shew-Fen Lin
(74) Attorney, Agent, or Firm—Finnegan, Henderson, Farabow, Garrett & Dunner, L.L.P.

(57) ABSTRACT

Systems and methods are provided for logically locking data objects in a database. According to one implementation, a method is provided that comprises receiving, from one of a plurality of data processing modules, a request to logically lock one or more data objects to limit access by other data processing modules, and querying an internal buffer, in which information on logically locked data objects are stored, whether the data objects are already logically locked. The method also includes storing information on the data objects which are not yet logically locked in the internal buffer, and processing the non-logically locked data objects, such that when updating the data objects in the database, the data objects are locked in the database by a database management system.

6 Claims, 8 Drawing Sheets

U.S. PATENT DOCUMENTS

| | | | | |
|---|---|---|---|---|
| 5,551,046 | A | * | 8/1996 | Mohan et al. .................. 707/8 |
| 5,983,225 | A | | 11/1999 | Anfindsen |
| 6,047,283 | A | | 4/2000 | Braun |
| 6,144,983 | A | | 11/2000 | Klots et al. |
| 6,216,207 | B1 | | 4/2001 | Miller et al. |
| 6,418,438 | B1 | | 7/2002 | Campbell |
| 6,631,366 | B1 | | 10/2003 | Nagavamsi et al. |
| 7,206,794 | B2 | | 4/2007 | Rapp |
| 7,328,263 | B1 | | 2/2008 | Sadjadi |
| 2002/0099703 | A1 | | 7/2002 | Whang et al. |
| 2003/0004945 | A1 | | 1/2003 | Teng et al. |
| 2004/0148447 | A1 | | 7/2004 | Conrad et al. |
| 2004/0186825 | A1 | * | 9/2004 | Dettinger et al. ............... 707/3 |
| 2004/0187121 | A1 | | 9/2004 | Barth et al. |

FOREIGN PATENT DOCUMENTS

| | | |
|---|---|---|
| EP | 1 566 751 A1 | 8/2005 |
| WO | WO 2004/025504 A1 | 3/2004 |

OTHER PUBLICATIONS

Anonymous, "Das SAP Sperrkonzept (BC-CST-EQ) Release 4.6C," Publication of SAP AG, [Online] Apr. 2001, pp. 1-38; retrieved from the Internet: URL:http://www.consolut.de/saphelp/deutscha/BCCSTEQ/BCCSTEQ_PT.pdf, retrieved on Apr. 6, 2006.

Gray, J. et al., "Transaction Processing: Concepts and Techniques (excerpt), Passage," Transaction Processing: Concepts and Techniques, 1993, pp. 373-445.

Mohan, C., "Interactions Between Query Optimization and Concurrency Control," Research Issues on Data Engineering, 1992: Transaction and Query Processing, Second International Workshop, Tempe, AZ, Feb. 2-3, 1992, IEEE Computer Society, Feb. 2, 1992, pp. 26-35.

Anonymous, "BC—ABAP Dictionary Release 4.6C," SAP Software Documentation, [Online] Apr. 2001, pp. 1-8, and 214-230; retrieved from the Internet: URL:http://help.sap.com/printdocu/core/Print46c/de/data/pdf/BCDWBDIC/BCDWBDIC.pdf, retrieved on Mar. 7, 2006.

Anonymous, "ABAP Programmierung (BC-ABA) Release 4.6C," Sap Software Documentation, [Online] Apr. 2001, pp. 1-16, and 1359-1391; retrieved from the Internet: URL:http://help.sap.com/printdocu/core/Print46c/de/data/pdf/BCABA/BCABA.pdf, retrieved on Mar. 7, 2006.

Read et al., "SAP Architektur," SAP Datenbank-Administration MIT Microsoft Sql Server 2000, Galileo Press, 2002, pp. 19-42.

EPO Communication and Search Report, dated Jun. 15, 2005 (8 pages).

Bernstein et al., "Concurrency Control and Recovery in Database Systems, Two Phase Locking," Concurrency Control and Recovery in Database Systems, Reading, Addison Wesley, US, pp. 47-111, 1987, Document No. XP002270716.

Gray et al., "Transaction Processing Concepts and Techniques (excerpt), Passage," Transaction Processing: Concepts and Techniques, pp. 373-445, 1993, Document No. XP002322153.

European Search Report, issued on May 18, 2005, in European Application No. 05100632.8 (4 pages).

Roesler et al., "Deadlock Resolution and Semantic Lock Models in Object-Oriented Distributed Systems," Proceedings of the 1988 ACM SIGMOD International Conference on Management of Data, 1988, pp. 361-370. Download: http://deliverv.acm.oro/10.1145/600000/50246/p. 361-roesler.pdf?kevl =50246&kev2=6245238221&col1=Acm&d1=ACM&CFID=13205.

PCT International Search Report and Written Opinion for PCT/EP2005/056484, mailed on Mar. 24, 2006 (14 pages).

PCT International Search Report and Written Opinion for PCT/EP2005/056483, mailed on Mar. 24, 2006 (12 pages).

Roman Rapp, U.S. Appl. No. 11/292,063, entitled "Methods, Computer Systems and Software Applications for Providing a Lock Service," filed Dec. 2, 2005.

Read, "SAP-Datenbankadministration mit Microsoft SQL Server 2000, Passage," Galieo Press GMBH, Germany, 2002, pp. 19-42, Document No. XP002332114.

* cited by examiner

METHODS, COMPUTER SYSTEMS AND SOFTWARE APPLICATIONS FOR PROVIDING A CENTRAL LOCK SERVICE

CROSS REFERENCE TO RELATED APPLICATION(S)

This application claims the benefit of priority to U.S. Provisional Patent Application No. 60/632,540 entitled, "Methods, Computer Systems and Software Applications for Providing a Central Lock Service," filed Dec. 3, 2004, the disclosure of which is expressly incorporated herein by reference to its entirety.

TECHNICAL FIELD

The technical field of the present invention is in the area of electronic data processing. More particularly, the invention relates to methods, computer program products and systems for data locking.

BACKGROUND INFORMATION

A database management system is usually equipped with a special lock mechanism that synchronizes access to data on the database. The purpose of the lock mechanism is to prevent two transactions from changing the same data on the database simultaneously.

Locks may be defined generically as "lock objects". A lock entry is a specific instance of a lock object and locks a certain database object, such as a correction or a table entry or a file or a whole table.

Locks are usually set and deleted automatically when user programs access a data object and release it again.

When interactive transactions are programmed, locks may be set and released by calling specific function modules.

The tables, in which data records should be locked with a lock entry, may be defined in a lock object together with their key fields. When tables are selected, one table (the primary table) is first selected. Further tables (secondary tables) can also be added using foreign key relationships, for example.

The lock argument of a table in the lock object may consist of the key fields of the table. The lock argument fields of a lock object may be used as input parameters in function modules for setting and removing locks generated from the lock object definition. When these function modules are called, the table entries to be locked or unlocked are specified by defining certain values in these fields. These values can also be generic or wildcards. The lock argument fields, therefore, define which subset of the table entries should be locked.

A simple case of a lock object comprises exactly one table and the lock argument of the table is the primary key of this table. Several tables can also be included in a lock object. A lock entry, therefore, can lock an entire logical object, and not only a record of a table. Such a logical object can be, for example, a document comprising an entry in a header table and N entries in a position table.

Further, a lock mode may be assigned for each table in the lock object. This mode may define how other users can access a locked record of the table. The lock mode controls, for example, whether several users can access data records at the same time. The lock mode can be assigned separately for each table in the lock object. When the lock is set, the corresponding lock entry is stored in the lock table of the system for each table.

Access by more than one user can be synchronized in the following ways:

Exclusive Lock: The locked data can only be displayed or edited by a single user. A request for another exclusive lock or for a shared lock is rejected.

Shared Lock: More than one user can access the locked data at the same time in display mode. A request for another shared lock is accepted, even if it comes from another user. An exclusive lock is rejected.

Exclusive But Not Cumulative: Exclusive locks can be requested several times from the same transaction and are processed successively. In contrast, exclusive but not cumulative locks can be called only once from the same transaction. All other lock requests are rejected.

It is possible to synchronize access by several programs to the same data with a logical lock mechanism having two main functions: A program can tell other programs which data records it is just reading or changing. A program can prevent itself from reading data that is just being changed by another program.

Data records of a table to be locked may also be defined by a logical condition. When a lock is set, for example, this logical condition is entered in a lock table. This entry is retained until it is removed by the program or the program comes to an end. All the locks set by a program are thus removed at the end of the program.

When accessing data records, the records being edited by other programs may be identified by the entry in the lock table. Such an entry for the lock may define a number of fully specified key fields. That is, either a value is passed for the key field or this field is locked generically by means of a wildcard.

In a multi-user system environment, as is frequently the case in enterprise business software and other computer system environments, data that is being processed by one user has to be locked, so that a second user can not change it at the same time. This is essential to avoid data inconsistencies.

Usually, data is locked via a key of the processed data (e.g., a document number, cost center ID, etc.). However, business transactions that process a lot of data at the same time (e.g., the costing of a car with several thousand components or the evaluation of a value flow net between many cost centers, activities and cost objects) can not lock every single piece of data via its key, since the number of locks that can be set is restricted because of limited hardware resources. For instance, a reasonable number of locks per transaction may be around 50 for larger multi-user systems. Anything more could harm the performance of the system. This is especially true, if several hundreds or thousands of users work at the same time setting locks in the system.

Thus, mass transactions such as those described above can not lock every single piece of data (e.g., every product number or cost center ID). Instead, wildcards are typically used in a lock entry so that it affects several single keys and many pieces of data can be locked via one entry (so-called "generic locking").

Wildcards, however, have to be used with care. Otherwise, too much data may be locked and other users can't continue with their tasks since they can't access needed data. For instance, during the calculation of a product with 100 sub-products, one can not lock all products by only having a wildcard in the lock entry for the product. Otherwise, other users could not run a costing of an independent product.

Another example of a lock mechanism in a multi-user system environment is presented in the following document: READ, Paul: "SAP Database Administration with Microsoft SQL Server 2000," Galieo Press GmbH, Germany, pages 19-42 (2002). The document discloses a locking mechanism in a SAP/R3 system. As described therein, a lock server (enqueue-server) administers logical locks in a lock table stored in the main memory of an application server. In that lock table, logical locks are set on a transaction level, whereas in the database management system (DBMS), the database locks are activated on a record level. During runtime, an application sends a lock request to the lock server, which queries the lock table for an entry in conflict with the lock request. If such an entry is found, the lock server rejects the lock request and sends a message to the user. If no conflicting entry is found, the lock server confirms the lock request and the application performs/stores the transaction, thereby locking the respective data objects via the DBMS.

In a highly dynamic and analytical working environment dealing with many data objects, none of the solutions mentioned above might be the only optimal one. It depends on how many users work with the data and how often objects are changed.

Furthermore, when working with data in a change mode, every object change has to request a lock first. This costs time and might be annoying for users wanting to go quickly through some data changes.

Thus, there is a need for improved methods, software applications and/or data processing systems that can provide a more efficient solution to one or more of the problems described above. Furthermore, it is desirable to provide a mechanism for locking data more efficiently.

The above description is based on the knowledge of the present inventors and not necessarily that known in the art.

SUMMARY OF THE INVENTION

In accordance with embodiments of the present invention, as embodied and broadly described herein, methods and systems are provided for processing data objects in a database of a computer system. In one embodiment, a system is provided for locking data objects by means of a database management system. The system comprises a lock service module for receiving from one of a plurality of data processing modules a request to set one or more logical locks for one or more data objects to limit access of other data processing modules to the data objects. The lock service module may be adapted to automatically select whether a single record locking or a generic range locking is used for setting the logical locks. In case single record locking is used, the lock service module may query an internal buffer, in which logical locks on single locked data objects are stored, whether the data objects are already logically locked, and set logical locks on the data objects which are not yet logically locked in the internal buffer. In case generic range locking is used, the lock service module may try to set logical range locks on the data objects. Further, according to the disclosed system, the lock service module may send a message on the success and/or failure of logically locking the data objects to the one data processing module. The one data processing module may process the successfully logically locked data objects and, when updating the data objects in the database, the data base management system may lock the data objects in the database.

A "lock service module" is hereinafter alternatively referred to as central lock service (CLS).

Embodiments of the invention may be utilized to install a central lock service on computer system, which may be implemented as one or more software modules running in the "background" and which manage data locking for one or more or all applications running on the computer system. This can provide full flexibility and allow optimization of the performance of the applications. For example, one or more applications may have their own CLS or one CLS may be available for a plurality of applications.

Methods and systems consistent with the invention can be used to optimize the locks in a central way and, thus, replace all existing ones, which can lead to a better maintainability of the system.

As an example, it might be helpful to already lock all data when starting an application, even if not every single data object will be changed.

In cases where it can be made sure that during the application flow two different users never work with the same data (e.g., because they work with different plants, versions or other key entities), logical locking mechanisms consistent with the present invention may be turned off to improve performance.

Embodiments of the invention are further directed to computer systems, computer programs, computer readable medium and carrier signals, each comprising program code or instructions for locking data objects in a computer system according to the inventive methods and embodiments disclosed herein.

Such computer programs can be installed as one or more programs or program modules on different hardware systems (computers or computer systems), and run separately and independently of each other, in their entirety being capable of performing the inventive methods and embodiments disclosed herein. In one embodiment, the different systems may be connected in the form of a network to communicate with each other.

Additional objects and advantages of the various embodiments of the invention will be set forth in part in the description, or may be learned by practice of the invention, as claimed herein. The objects and advantages of the embodiments of the invention will be realized and attained by means of the elements and combinations particularly pointed out in the appended claims. The various embodiments can include and/or exclude different aspects, features and/or advantages, where applicable. In addition, various embodiments can combine one or more aspects or features of other embodiments, where applicable.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

It is to be understood that both the foregoing general description and the following detailed description are exemplary and explanatory only, and should not be deemed restrictive of the full scope of the embodiments of the invention.

BRIEF DESCRIPTION OF THE DRAWINGS

The accompanying drawings, which are incorporated in and constitute a part of this specification, illustrate exemplary embodiments of the invention and, together with the description, explain the principles of the invention. In the drawings.

DESCRIPTION OF THE EMBODIMENTS

Figure 1A:
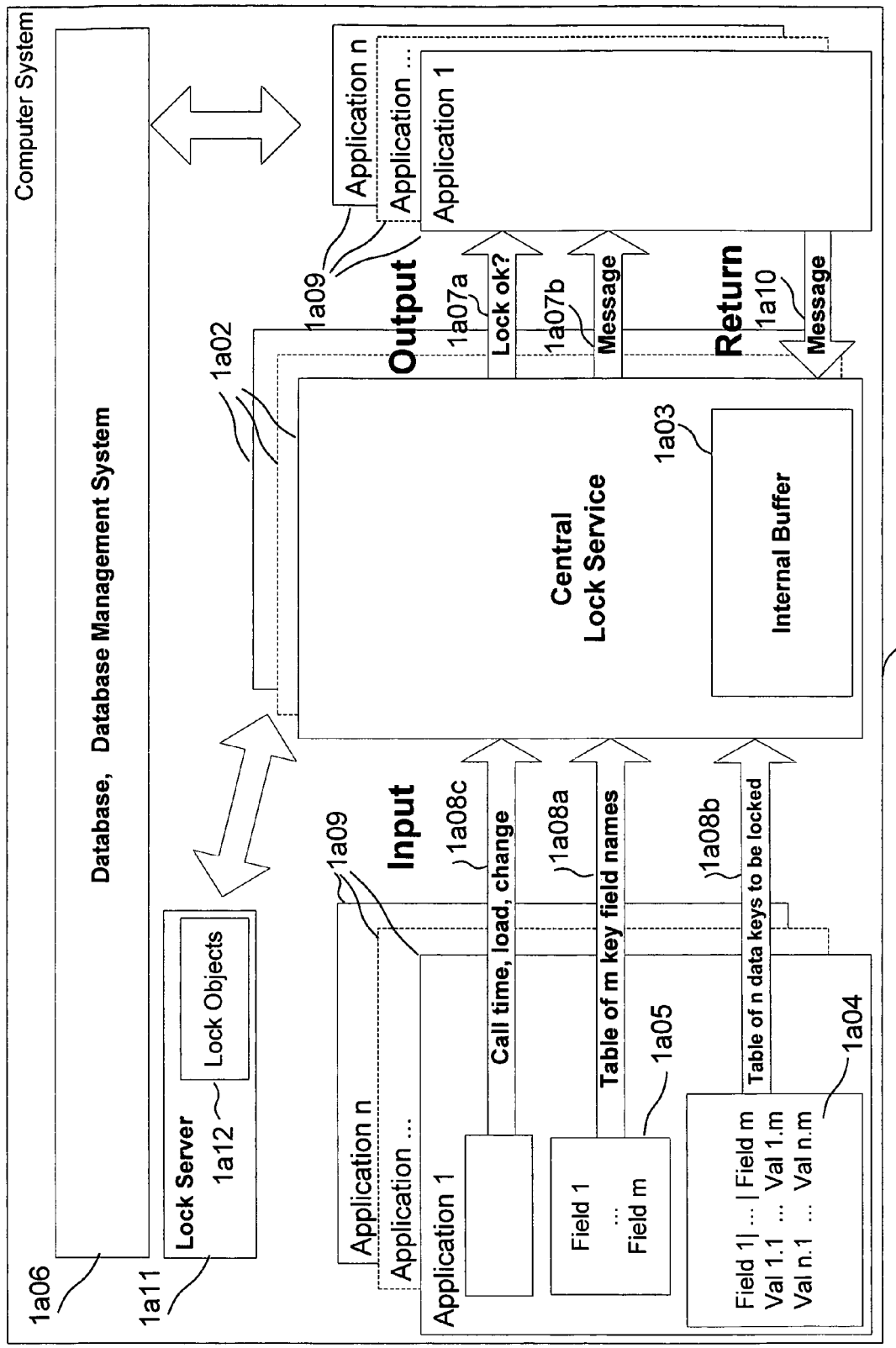
FIG. 1a illustrates an exemplary computer system and implementation of input/output data for a central lock service, consistent with an embodiment of the invention.

Within the concept of this specification, the terms used shall have their usual meaning in the context of the field of data processing unless defined otherwise. Particularly, a "computer system" broadly refers to any stand alone computer, such as a PC or a laptop or a series of computers connected via a network, e.g., a network within a company, or a series of computers connected via the Internet. Further, computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system.

The first and/or each further application may be any application running on a computer system and accessing data objects for read or write or delete or move operations.

In this context, the term "automatically" is not intended to exclude a user's interactions with the computer system in the course of processing.

Further, within the concept of this specification, the term "step" shall be interpreted broadly. This means that the term is intended to refer not only to a single action or command, but also to a plurality of actions or commands, or program modules or the like.

The methods described herein may be implemented by means of computer system(s) and computer software, which allows the creation of business software applications and which allows the use of databases or database applications and Internet applications.

A lock object may be implemented as one or more lines of one or more tables in a database, preferably in a relational database. In object oriented programming languages, a lock object may be implemented as an instance of a class. The terms "data base locks" and "physical locks" are used alternatively and both broadly refer to locks using the primary keys of every single affected database table. The term "logical locks" broadly refers to locks using one or more parts of keys of one or more tables or to locks using logical conditions in a lock table or, more generally, to locks not set by a data base management system.

The terms "single lock mechanism" and "single record locking" broadly refer to the general known mechanism of locking single records.

The term "generic lock mechanism" broadly refers to range locking, e.g., by means of wildcards in key fields to specify primary key prefixes.

If "locking" is not expressly related to database/physical locks, the terms "locking" or "locks" refer to logical locks.

The term "data object" broadly refers to any data in a database, which is identified by a key.

According to one embodiment of the invention, a further module for generating the logical locks may be available in addition to the lock service module. The latter is hereinafter alternatively referred to as "central lock service" (CLS), and the further module is hereinafter alternatively referred to as "lock server" or "enqueue server". As disclosed herein, the lock server may generate the logical locks upon request from a central lock service.

The central lock service may be called under various conditions. For example, consistent with one embodiment of the invention, the central lock service may be called, when: 1) an application is being started and knowing the data it will use (e.g., load of a working environment) or 2) a single object or several objects in the application is requested to be changed (e.g., manual change or calculation of a network of cost flows) or 3) the application releases and/or commits data changes (saving of a working environment). As input data for cases 1) and 2), the names of the m key fields of the n data objects to be changed may be provided to the central lock service.

The central lock service may be provided with a buffer. The buffer of the central lock service may be implemented as an internal table, for example. As information on data objects, the content of key fields of the respective data objects may be stored in the internal buffer. This information may also be copies of logical locks generated by the lock server. The central lock service can thus check in its own buffer, if an object was already locked. This is more efficient, particularly in a multi-user or multi-application environment, than sending the lock request to a further module, e.g., the lock server.

In accordance with one embodiment of the invention, a method is provided for locking data objects by means of a database management system. The method comprises: receiving, with a lock service module, a request from one of a plurality of data processing modules to set one or more logical locks for one or more data objects to limit access of other data processing modules to the data objects; and automatically selecting, with the lock service module, a single record locking or a generic range locking for setting the logical locks. In case single record locking is used, the lock service module may query an internal buffer, in which logical locks on single locked data objects are stored, whether the data objects are already logically locked, and set logical locks on the data objects which are not yet logically locked in the internal buffer. In case generic range locking is used, the lock service module may try to set logical range locks on the data objects. Further, the method may include sending, with the lock service module, a message on the success and/or failure of logically locking the data objects to the one data processing module, and processing, with the one data processing module, the successfully logically locked data objects. Moreover, when updating the data objects in the database, the data base management system may lock the data objects in the database.

In a further embodiment, methods consistent with the invention comprise, after receiving a request and before selecting between single record locking and generic range locking, the following steps: automatically selecting, with the lock service module, whether (i) the data objects are to be logically locked when changes of the data objects are requested, or (ii) the data objects are to be logically locked when the first or each further data processing module is started, or (iii) the data objects are not to be logically locked and, in such a case, skipping the selecting between single record locking and generic range locking and processing the data objects by means of the database management system, which performs the locking of the data objects in the database when updating the data in the database.

In a still further embodiment, a generic lock mechanism may be used if more than a pre-settable number of locks are to be set.

The functionality of "selecting" may be implemented by, for example, querying entries in data fields or data objects, e.g. flags, followed by corresponding program branching.

In the case of a single lock mechanism, the internal buffer may be implemented as a table that keeps a list of all locked objects, e.g. by storing key fields of the locked objects. The term "internal" in context to the buffer means that the buffer is used by the respective CLS only. In one embodiment, the buffer is managed within the CLS and not visible outside (i.e., in object oriented programming terms: a private attribute).

A further embodiment of the invention is characterized in that the settings are configurable per application and/or per user.

According to another embodiment of the invention, the method further comprises: receiving, with the lock service module, names of one or more (m) key fields of the one or more data objects to be locked; receiving, with the lock service module, n values for each of the m key fields of n data objects to locked; receiving, with the lock service module, a maximum number (k) of locks to lock the n data objects; checking, with the lock service module, whether n<=k and (i) in case yes, creating one or more lock objects comprising the m names and n values for the m key fields, and (ii) in case no, querying the n values of the m key fields and determining numbers (y1 to ym) of different values (Val_1.1 to Val_m.ym) of the key fields 1 to m; and determining, with the lock service, consecutively from a first to i-th field where i<=m until y1* . . . * yi>=k and, in case the condition is satisfied, creating one or more lock objects comprising the names of the key fields 1 to m and values Val_1.1 to Val_(i−1).y(i−1) for the key fields 1 to i−1 and comprising wildcards for the remaining key fields.

A further embodiment comprises determining one or more common characteristics of different values of a key field for the remaining key fields and writing the determined common characteristics and one or more wildcards into the remaining key fields of the or each lock object. A common characteristic may be a character string consisting of one or more consecutive characters of the characters forming the value. For example, in values like A1BC123, A2BC234, "A" and "BC" are common characteristics. Thus, A3BC345 may be replaced by A?BC*. In this case, "?" is a wildcard for a single character, and "*" is a wildcard for any number of characters.

Processors suitable for the execution of computer programs consistent with embodiments of the invention include, by way of example, both general and special purpose microprocessors, and any one or more processors of any kind of digital computer. Generally, a processor will receive instructions and data from a read-only memory or a random access memory or both. The elements of a computer may include a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, embodiments of the invention can be implemented on a computer system having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or haptic feedback; and input from the user can be received in any form, including acoustic, speech, or haptic input.

Referring now to FIG. 1a, a block diagram is provided that comprises an exemplary computer system 1a01 and a software module 1a02 representing a central lock service module (CLS), consistent with an embodiment of the present invention. In the example fo FIG. 1a, time proceeds from left to right.

As shown in FIG. 1a, one of a plurality of first processing modules 1a09, e.g. (software) "application 1" 1a09, may send a request comprising request information 1a08a, 1a08b, 1a08c for logically locking a number of n data objects as input data to a central lock service 1a02. The request part 1a08a may comprise a table 1a05 including the names of m key fields of the data objects subjected to the lock request. Request part 1a08b may comprise values val.1.1 to val.n.m of the m key fields for the n data objects.

As further illustrated in FIG. 1a, the request is forwarded to a lock server 1a11 that generates the logical locks 1a12.

In accordance with the embodiment of FIG. 1a, the CLS 1a02 comprises an internal buffer 1a03, which contains copies of logical locks 1a12. Buffer 1a03 may be implemented as an internal table. Thus, if an application 1a09 tries to logically lock the same object again (e.g., because a user changes it a second time during one online session), the CLS first checks via its buffer 1a03 if the lock is already done and if not, it will lock the data objects via database management system 1a06. This process can be particularly advantageous if, for example, the CLS works with a the single lock mechanism.

After logically locking/not logically locking the data objects, the central lock service returns information 1a07a, e.g. a flag, whether the requested logical locks could be done to the calling application 11a09. A "?" or other suitable character in information 1a07a indicates that the lock service may give the answer to this question as a Yes or No. If the logical locks could not be set, it returns information 1a07b, e.g. a table of explaining messages, indicating that requested objects were already logically locked by another user. Such information 1a07a,b are beforehand received by the CLS from the lock server 1a12 and may be enriched with explaining text by CLS 1a02.

Applications 1a04 process the non-locked data objects and, when updating the data objects in database 1a06, the data base management system 1a06 sets the physical locks in the database.

Figure 1B:
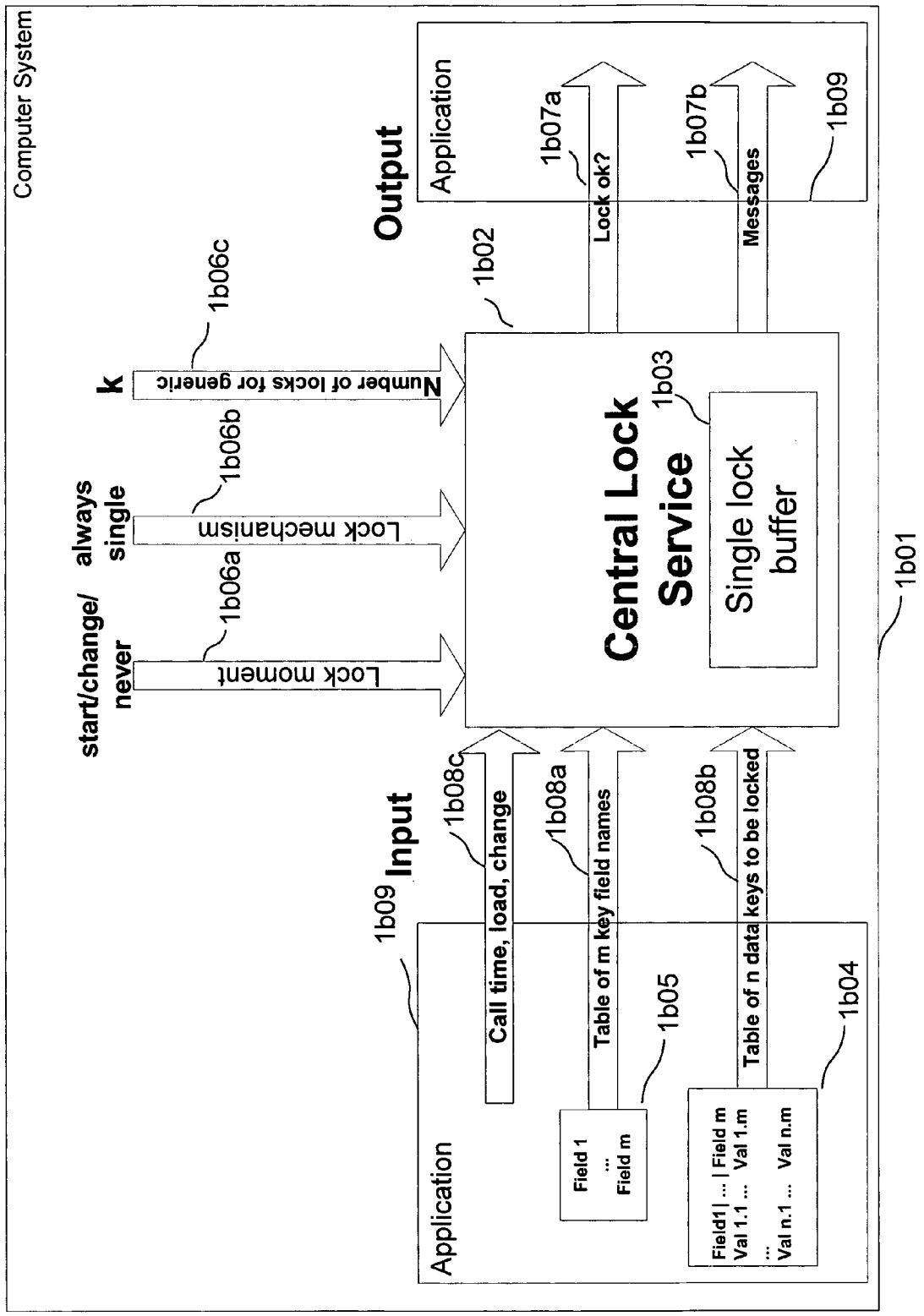
FIG. 1b illustrates an exemplary computer system and further implementation of input/output data for a central lock service, consistent with an embodiment of the invention.

FIG. 1b illustrates a further diagram comprising an exemplary computer system 1b01 and a software module 1b02 representing the central lock service module, in accordance with an embodiment of the present invention. Analogous to FIG. 1a, a first processing module, e.g. software application 1b09, may send a request comprising request information 1b08a, 1b08b, 1b08c for locking a number of n data objects as input data to a central lock service 1b02. The request part 1b0a may comprise a table 1b05 including the names of m key fields of the data objects subjected to the lock request. Request part 1b08b may comprise values val.1.1 to val.n.m of the m key fields for the n data objects. In one embodiment, depending on pre-settable rules 1b06a, the central lock module 1b02 may select, using a built-in logic, how the lock request has to be proceeded. For example, set 1b06a may provide conditions under which locking is started immediately after receiving the lock request or shortly before changes are made on the data objects or whether the data objects are not locked at all for the particular request. In another embodiment, a further set 1b06b provides conditions under which a single lock mechanism or a generic lock mechanism is applied. In a still further embodiment, a further set 1b06c provides a minimum number k of the n data objects, which has to be exceeded if a generic lock mechanism has to be applied.

All sets 1b06a, 1b06b, 1b06c may be different for different applications 1b09 sending the lock request and/or for different users using the applications 1b09. Information for these decisions may be stored in tables accessed by the central lock service 1b02.

After querying buffer 1b03 and logically locking/not locking the data objects, the central lock service 1b02 returns information 1b07a, e.g. a flag, whether the requested locks could be done. A "?" or other suitable character in information 1b07a indicates that the central lock service may give the answer to this question as a Yes or No. If the logical locks could not be set, it returns information 1b07b, e.g. a table of explaining messages, indicating that requested objects were already logically locked by another user. The locks itself may be generated by a lock server, which in turn may be a part of the CLS or which may be independent of the CLS.

As further described below, the reaction of the central lock service depends on the settings, e.g., the call moment for the requested lock.

Figure 1C:
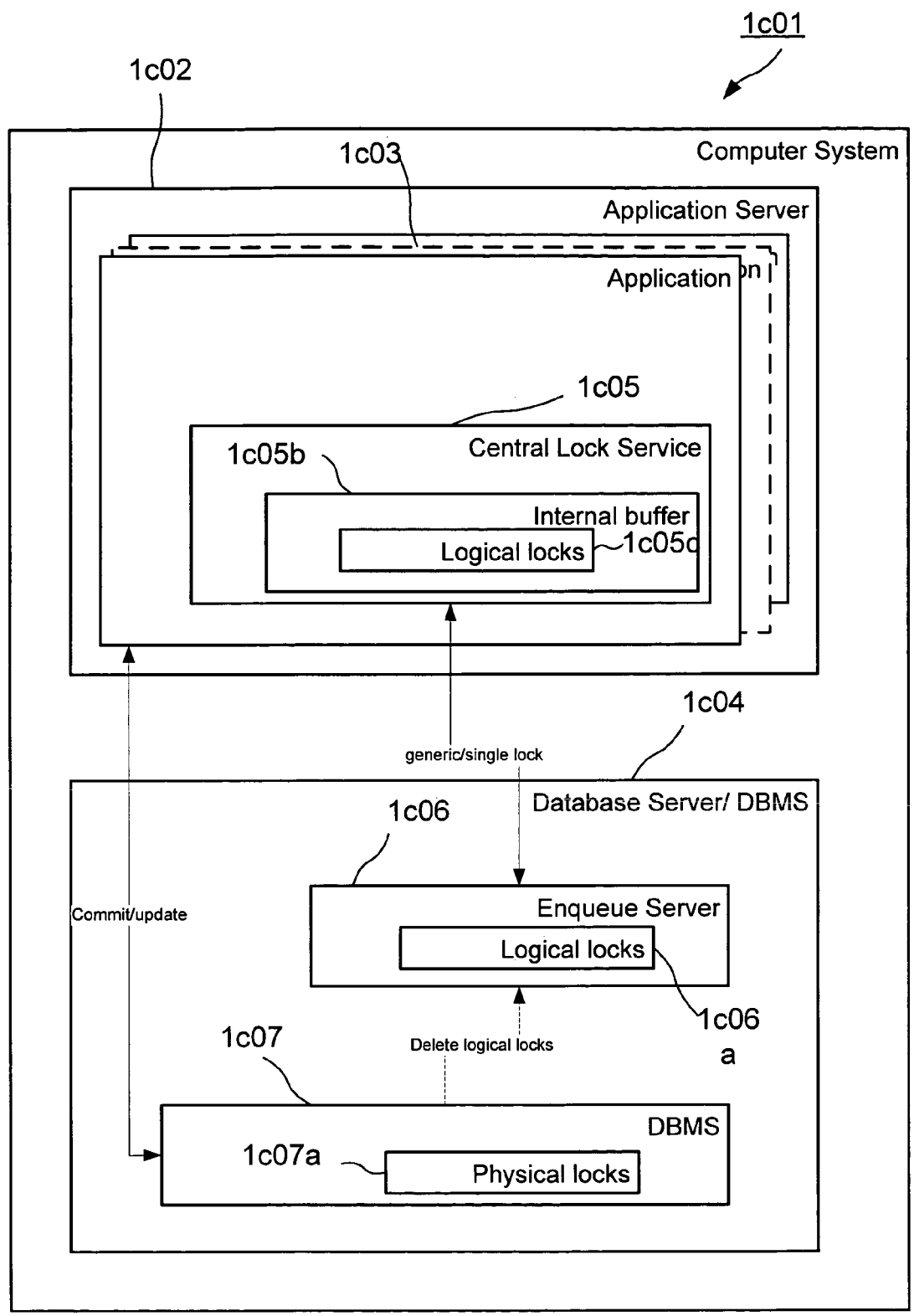
FIG. 1c illustrates an exemplary computer system and program modules for providing a central lock service, consistent with an embodiment of the invention.

Referring now to FIG. 1c, a further embodiment of the invention is illustrated. As shown in FIG. 1c, an exemplary computer system 1c01 comprises an application server 1c02 and a database server 1c04 including a database management system (DBMS). Both servers may be connected via a network. One or more data processing modules (applications) 1c03 and one or more lock service modules (Central Lock Service, CLS) 1c05 are running/installed on the application server 1c02, each application 1c03 having one lock service module 1c05. In an alternative embodiment, one lock service module 1c05 may be designed to be available for all applications 1c03. A lock server 1c06 (enqueue server) is running/installed on the database server 1c04.

During runtime, one of the applications 1c03, which may for example be a single transaction, sends a lock request to the central lock service 1c05. The central lock service selects the conditions for the setting of the logical locks as pointed out above and sends a corresponding request for logical locks to the lock server 1c06. The lock server 106c tries to set/generate the logical locks 1c06a according the selection and returns a message on the success and/or failure of setting the logical locks 1c06a to the central lock service 1c05, which in turn forwards it to the application 1c03. Application 1c03 then further processes the data objects on which logical locks c06a could be successfully set. When physically updating/committing the data objects in the database, the DBMS creates physical locks 1c07a for the requested data objects.

In one embodiment, the selection or determination of the central lock service 1c05 that no logical locks are set has the meaning that all data objects, for which the application has requested a logical lock, can be processed. Application 1c02 then may perform a read and/or write operation on the data objects in the database. If the operation was successful, the DBMS 1c07 releases the DBMS locks 1c07a.

The application sends a corresponding message to the central lock service 1c05 to delete the logical locks 1c06a on the data objects. The central lock service 1c05 then sends a corresponding request to the lock server 1c06.

In an alternative embodiment, the application 1c03 may wait for a confirmation of the release of the locks 1c07a by the DBMS 1c07 before requesting the deletion of the logical locks 1c06a.

In a further alternative embodiment, the DBMS 1c07 may directly delete the logical locks 1c06a in the lock server 1c06. Further, the central lock service 1c05 comprises an internal buffer 1c05b, in which copies 1c05c of the logical locks 1c06a are stored. In this case, only logical locks held in that buffer of the central lock service 1c05 have to be deleted via a request of the application 1c03 to the central lock service 1c05.

Figure 2:
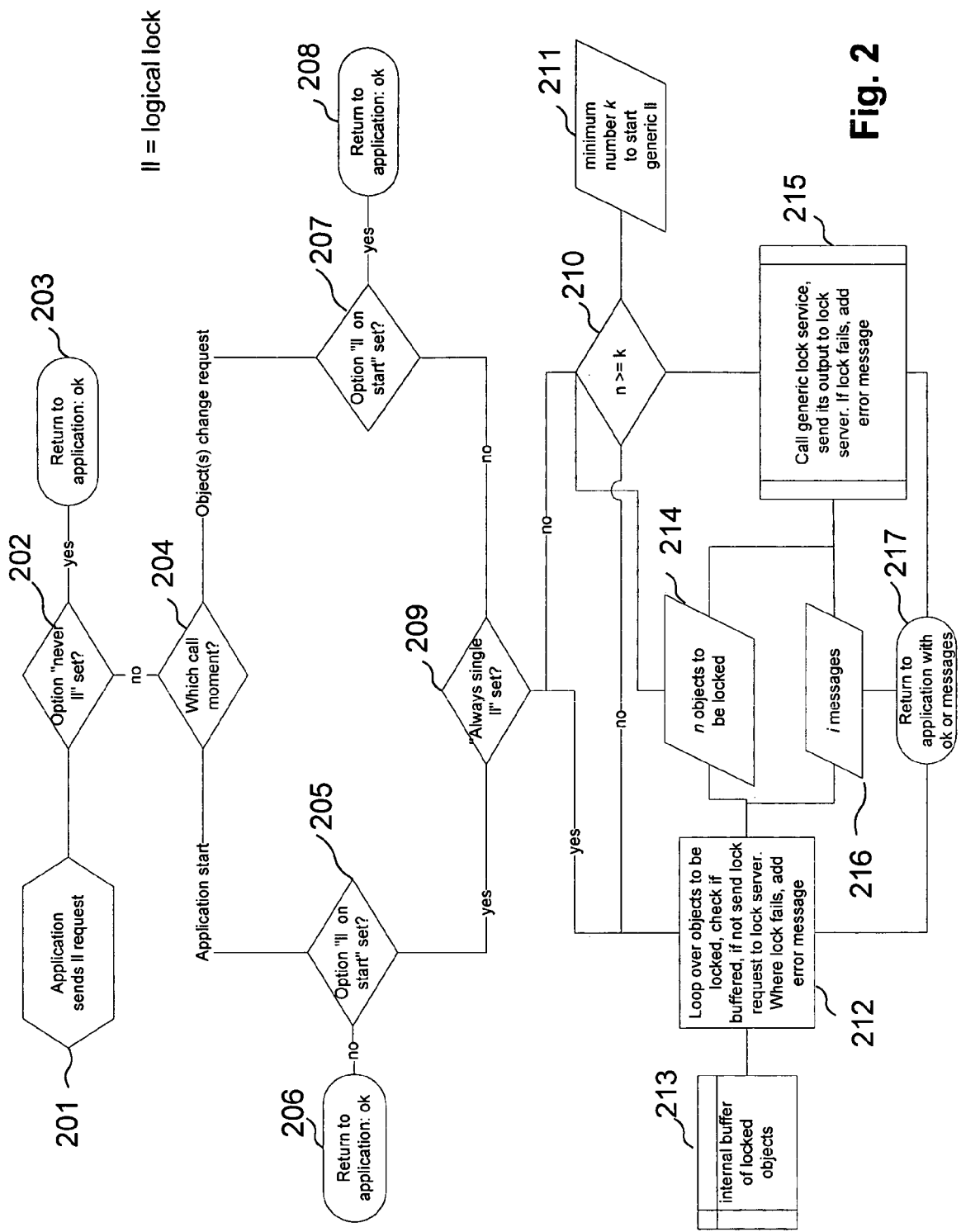
FIG. 2 is a flow diagram of an exemplary method for providing a central lock service, consistent with an embodiment of the invention.

Referring now to FIG. 2, a further embodiment of a method consistent with the invention is illustrated by way a flow diagram, which summarizes steps that may be performed in the course of a lock request.

In a first step 201, application 1b09 sends a lock request comprising information 1b08a,b,c to the central lock service module 1b02. In step 202, module 1b02 checks, for example by querying preset flags, whether an option "never lock" 1b06a has been set. If this option has been set, a confirmation is sent back to application 1b09 in step 203 and the lock request is terminated. If the option has not been set, the lock request process branches in step 204, depending on the moment and whether the lock request has been sent. If the lock request has been set when application 1b09 has been started, it is checked in step 205 whether an option "lock on start" 1b06a has been set or not. In case this option has not been set, a confirmation is sent back to application 1b09 in step 206 and the lock request is terminated. If this option has been set, the lock process continues with step 209. If, in step 204, it turns out, for example by evaluating information 1b08a,b,c received from the application, that the lock request has been sent in the course of processing data objects, wherein changes have to be made on such objects, it is checked in step 207 of another branch of the lock request process, whether the option "lock on start" 1b06a has been set or not. If this option has been set, a confirmation is sent back to application 1b09 in step 208 and the lock request is terminated. If this option has not been set, the lock process continues with step 209. In step 209 it is checked, whether an option "always single lock" 1b06b has been set or not. If this option has been set, every data object to be locked has to be locked by a single lock and the process continues with step 212, in which step it is first checked, by querying an internal buffer 213, in which information on already logically locked data objects are stored, whether or which of the data objects, which are requested to be locked in the current lock request process, are already locked. The number n of data objects to be locked may be taken, for example, from a data object 214, which may be part of the information 1b08a,b. For the data objects, which are not yet locked, a lock request is sent to the central lock service. The central lock service then returns confirmation messages, if the data objects could be logically locked, or error messages, if the locks failed. These messages 1b07a,b are then returned to application 1b09 in step 217. The messages may be stored in a data object 216, which then is passed to application 1b09.

Figure 4:
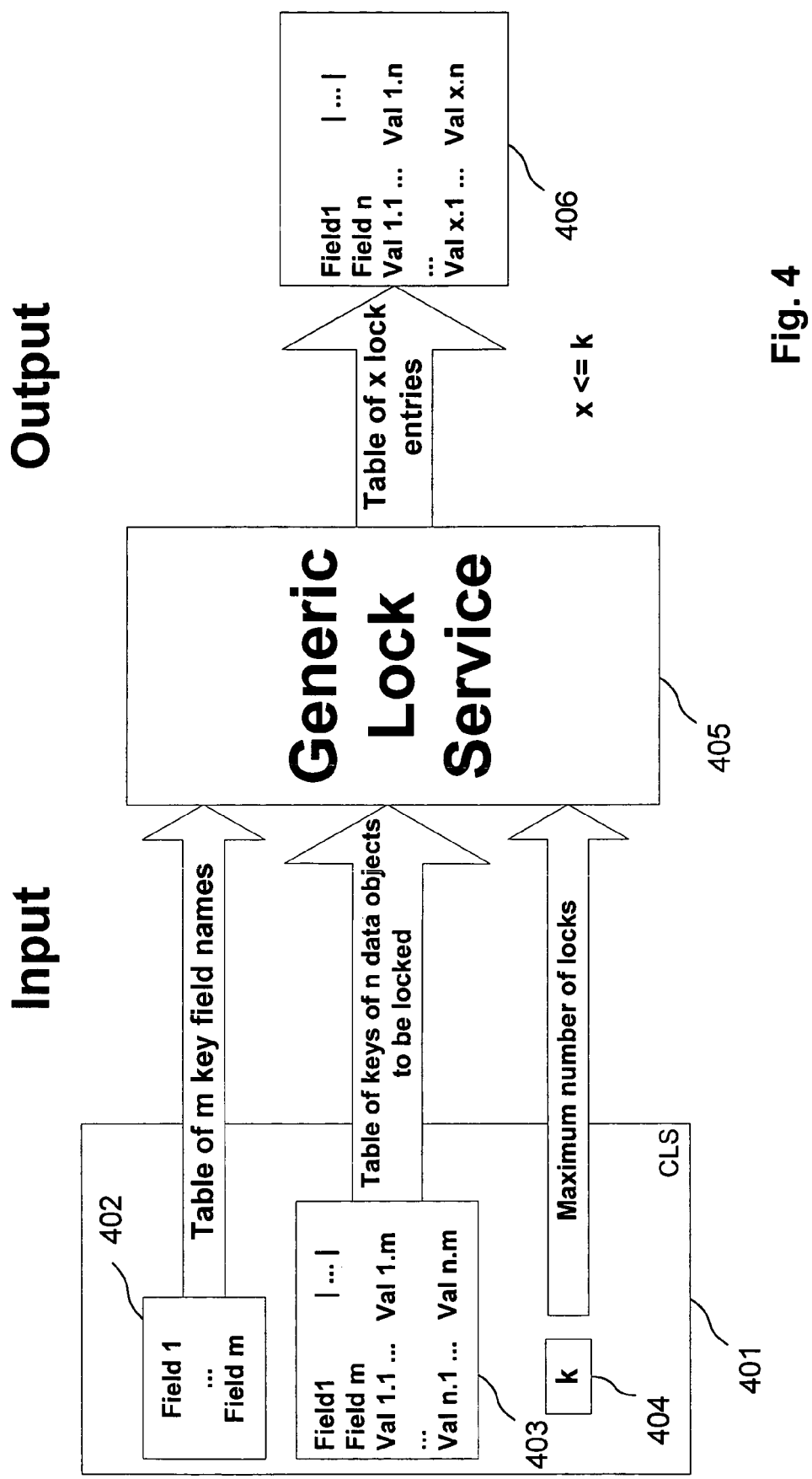
FIG. 4 is a block diagram for illustrating an example of possible interactions between program modules and data, consistent with an embodiment the invention.
Figure 5:
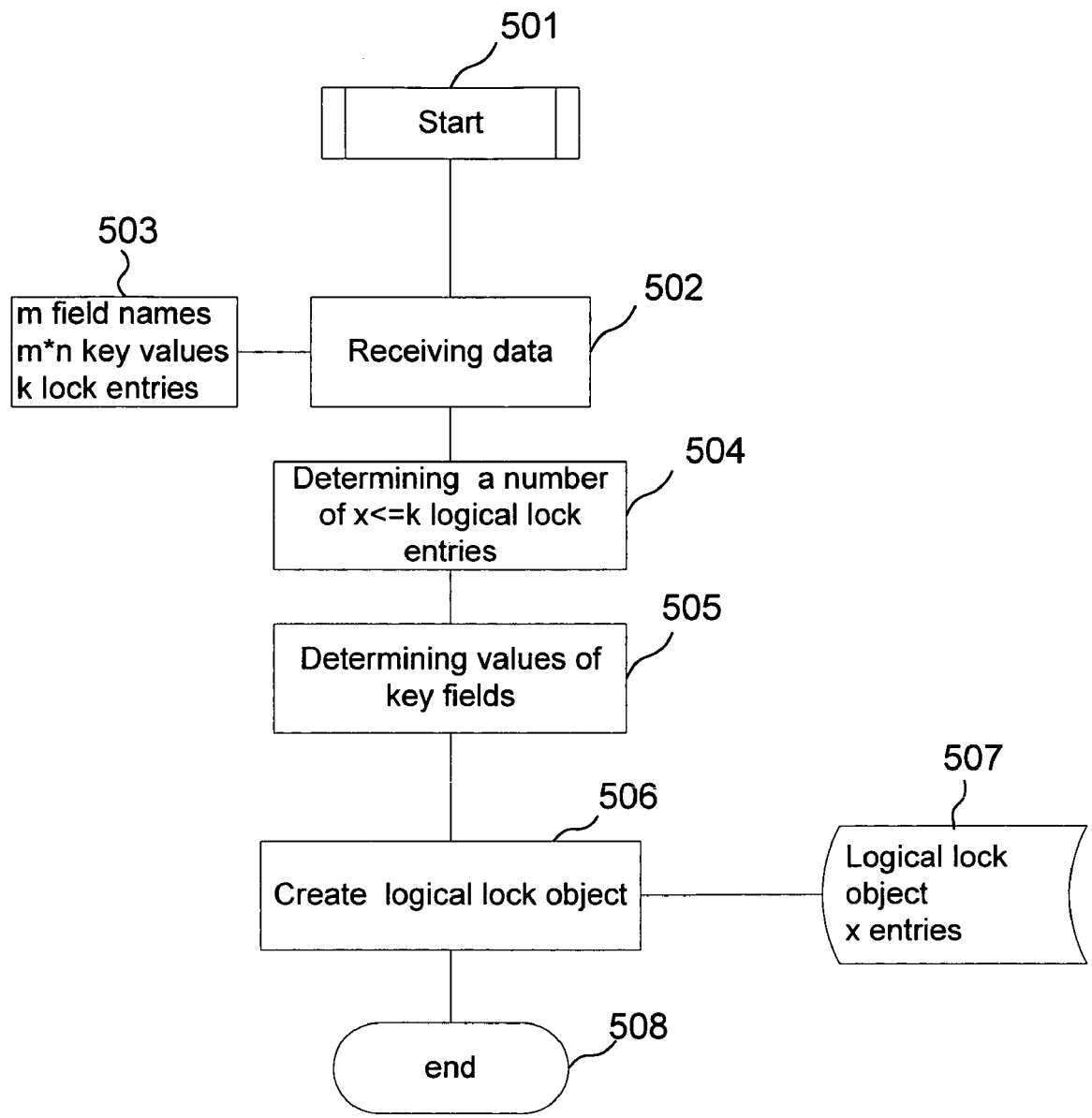
FIG. 5 is a flow diagram for illustrating an exemplary method, consistent with an embodiment of the present invention.

If, in step 209, the check revealed that the option "always single lock" has not been set, it is checked in a step 210, whether the number n data objects to be locked, is larger or equal than a minimum number k, 1b06c in FIG. 1b, required for starting a generic lock service 215, which in turn is described in more detail in FIGS. 4 and 5 and the respective description. The number k may be taken from a data object 211, which may be part of the generic lock service 215 or of general settings of the system. If n is smaller than k, the process continues with step 212 described above. In the other case, the generic lock service 215 is called to generate data for setting logical locks for the data objects by means of wild cards. The generic lock service 215 may generate a lock object or, alternatively, send the generated data to a lock server (not shown) to generate the locks. The generic lock service 215 returns confirmation messages or error messages, which are returned to application 1b09 in termination step 217, as already described.

If the application 1b09 releases changes, it informs the central lock service, so all corresponding existing logical locks from that application, including the ones in the internal buffer, can be deleted.

Figure 3A:
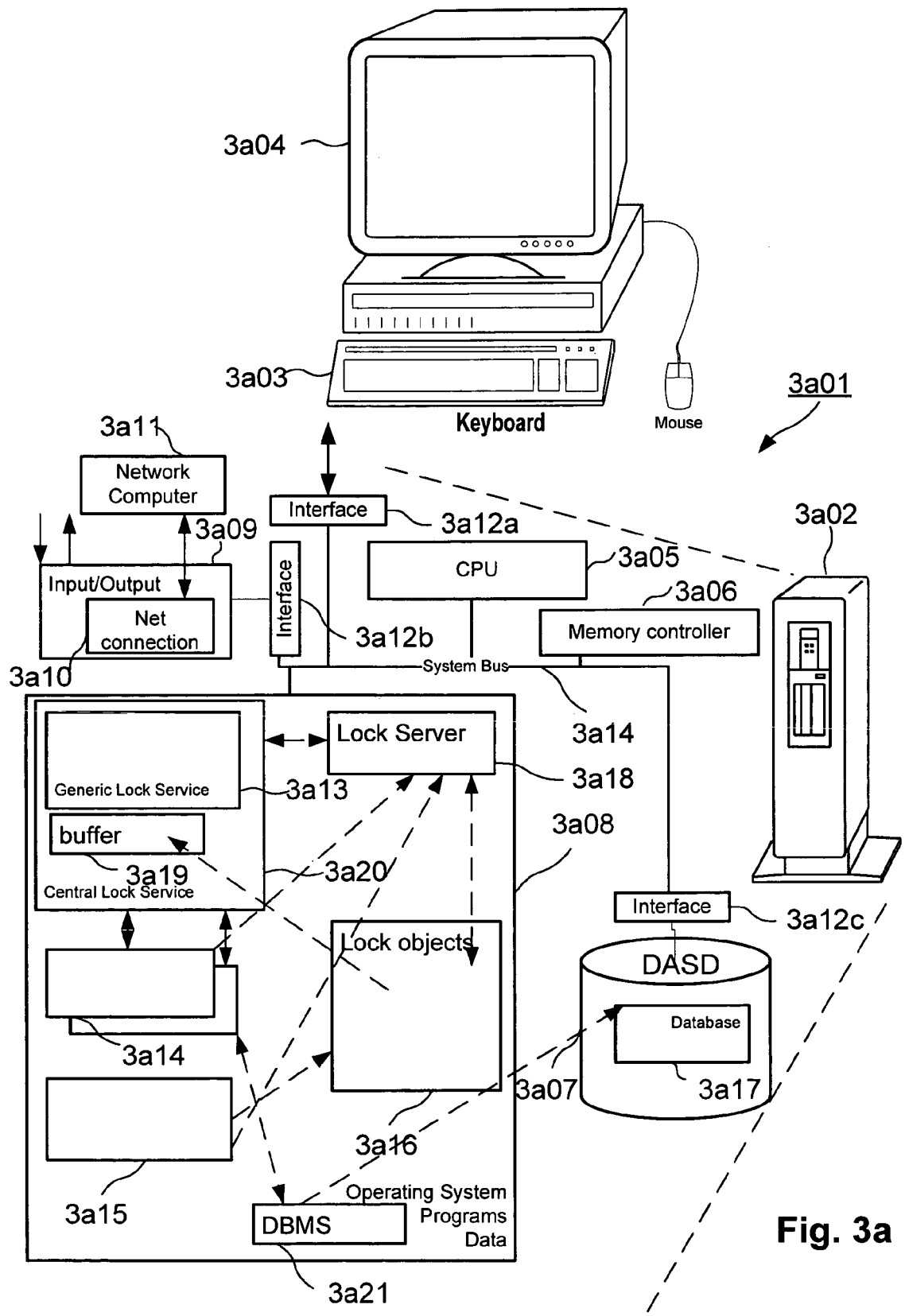
FIG. 3a is a block diagram for illustrating an exemplary implementation of a computer system, consistent with an embodiment of the invention.

Referring now to FIG. 3a, an exemplary computer system 3a01 is illustrated comprising a computer 3a02 and operating means 3a03, 3a04, in accordance with a further embodiment of the present invention. Those skilled in the art will appreciate that the disclosed methods and systems of the present invention apply equally to any computer system, regardless of whether the computer system is a complicated multi-user computing apparatus or a single user device such as a personal computer or workstation.

In the embodiment of FIG. 3a, computer 3a02 comprises a processor 3a05, a main memory 3a08, a memory controller 3a06, an auxiliary storage interface 3a12c, a general input/output interface 3a12b and a terminal interface 3a12a, all of which are interconnected via a system bus 3a14. As will be appreciated, various modifications, additions, or deletions, such as the addition of cache memory or other peripheral devices, may be made to computer system 3a01 within the scope of the present invention. Thus, FIG. 3a is presented to simply illustrate some of the salient features of computer system 3a01.

Processor 3a05 may perform computation and control functions of computer system 3a01, and comprises a suitable central processing unit (CPU). Processor 3a05 may comprise a single integrated circuit, such as a microprocessor, or may comprise any suitable number of integrated circuit devices and/or circuit boards working in cooperation to accomplish the functions of a processor. Processor 3a05 may execute computer programs within main memory 3a08, such as object oriented programs.

Auxiliary storage interface 3a12c may allow computer system 3a01 to store and retrieve information from auxiliary storage devices, such as magnetic disks (e.g., hard disks or floppy diskettes) or optical storage devices (e.g., CD-ROM). By way of example, one suitable storage device is a direct access storage device (DASD) 3a07. As illustrated in FIG. 3a, DASD 3a07 may be a hard disk drive which may read programs and data from a hard disk. It is important to note that while embodiments of the present invention are described in the context of a fully functional computer system, those skilled in the art will appreciate that the mechanisms and features of the present invention may be distributed as a computer program product in a variety of forms, and that the present invention applies equally regardless of the particular type of signal bearing media to actually carry out the distribution. Further examples of signal bearing media include: recordable type media such as floppy disks and CD ROMS, and transmission type media such as digital and analogous communication links, including wireless communication links.

Memory controller 3a06, through use of a processor, may be adapted to move requested information from main memory 3a08 and/or through auxiliary storage interface 3a12c to processor 3a05. While for the purposes of explanation, memory controller 3a06 is shown as a separate entity, those skilled in the art will understand that, in practice, portions of the function provided by memory controller 3a06 may actually reside in the circuitry associated with processor 3a05, main memory 3a08, and/or auxiliary storage interface 3a12c.

Terminal interface 3a12a may allow system administrators and computer programmers to communicate with computer system 3a01, normally through monitor 3a04, keyboard 3a03, mouse, trackball and the like or through programmable workstations. Although the system 3a01 depicted in FIG. 3a contains only a single main processor 3a05 and a single system bus 3a14, it should be understood that the present invention applies equally to computer systems having multiple processors and multiple system buses. Similarly, although the system bus 3a14 of the further embodiment is a typical hardwired, multidrop bus, any connection means that supports directional communication in a computer-related environment could be used.

Input/output interface 3a12b may allow computer system 3a01 via processor 3a05 to communicate with general input/output means 3a09, including a network connection 3a10, for sending and/or receiving data, e.g. for a network connection with one or more further computer systems 3a11, or for sending or receiving of data to or from other parties. A plurality of computer systems like computer system 3a01, can be connected via the network connection 3a10 in the form of a network. In such a case, the network computers 3a11 can be used as further input/output means, including the use as further storage locations.

In one embodiment, memory 3a08 includes an operating system, programs and data, particularly a central lock service module 3a20, a lock service module 3a13 (generic lock service), both communicating with lock server 3a18, and a plurality of first processing module 3a14 capable of sending a request to the central lock service 3a20. Memory 3a08 further comprises a further data processing module 3a15, and a lock object 3a16 for logically locking data objects of a database 3a17 available in DASD storage 3a07. Consistent with the present invention, the lock service module 3a13 comprises an internal buffer 3a19 for storing information on already locked data objects, e.g. copies of the lock object(s) 3a16.

It should be understood that memory 3a08 is used in its broadest sense, and can include Dynamic Random Access Memory (DRAM), Static RAM (SRAM), flash memory, cache memory, etc. Further, while not explicitly shown in FIG. 3a, memory 3a08 may be a single type of memory component or may be composed of many different types of memory components. For example, memory 3a08 and CPU 3a05 may be distributed across several different computers that collectively comprise system 3a01. It should also be understood that programs in memory 3a08 can include any and all forms of computer programs, including source code, intermediate code, machine code, and any other representation of a computer program.

The operating system provides the basic functionality that controls the computer system 3a01. Operating system can comprise any suitable operating system, such as IBM's OS/400, OS/2, Microsoft's Windows, Java and the various flavors of UNIX. Database 3a17 provides a mechanism for persistently storing data objects and object data in the computer system 3a01. Database 3a17 can be implemented as any suitable database, including a relational database such as those available from IBM, Oracle or Microsoft. Database 3a17 may also provide a standard database locking mechanism, which may be used by applications 3a14, 3a15 when committing/updating the processed data objects.

Those skilled in the art will appreciate that more than one of the above-mentioned processors may work in parallel in a computer system.

Figure 3B:
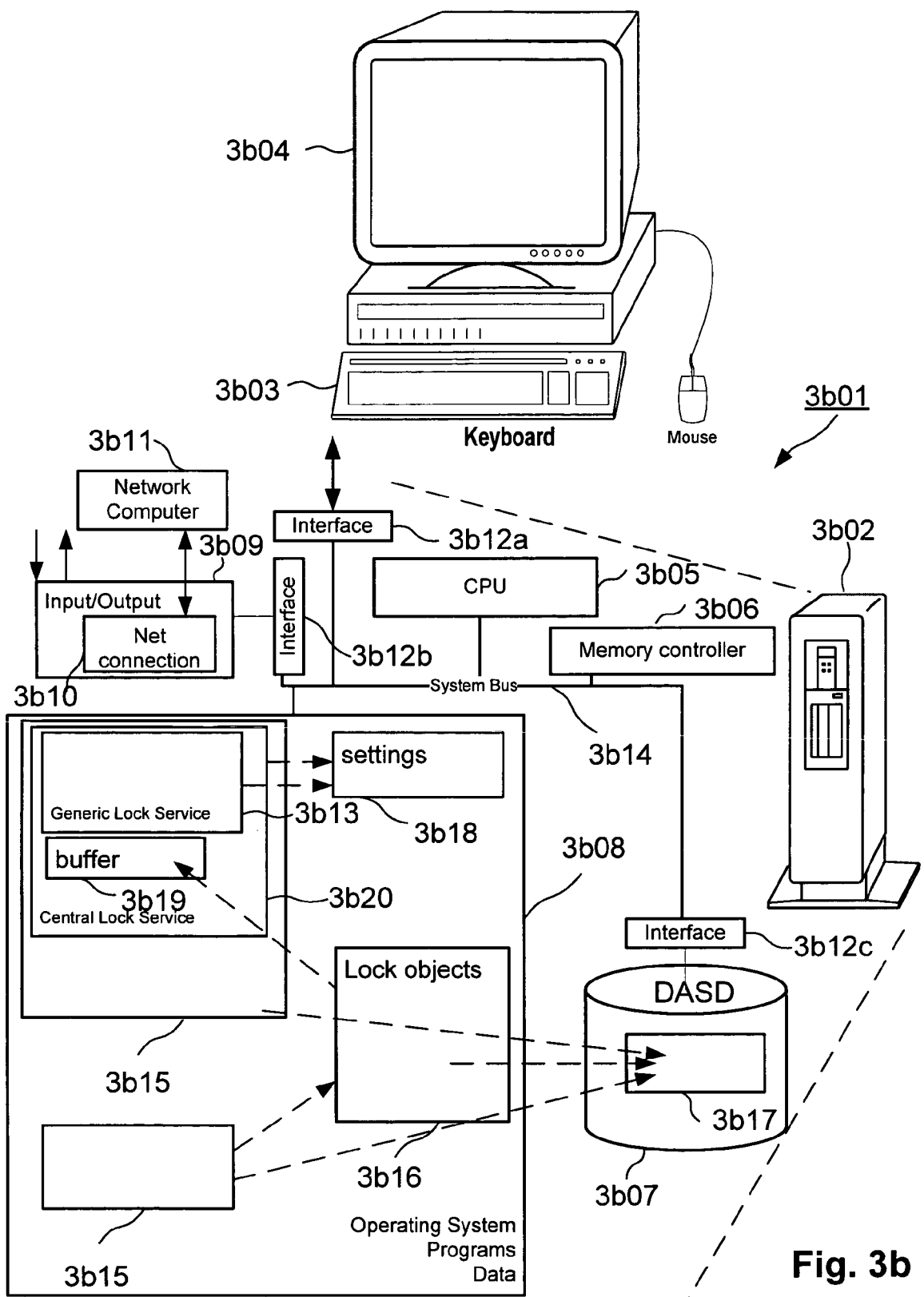
FIG. 3b is a block diagram for illustrating a further exemplary implementation of a computer system, consistent with an embodiment of the invention.

FIG. 3b, illustrates an exemplary computer system 3b01 comprising a computer 3b02 and operating means 3b03, 3b04, in accordance with a further embodiment of the present invention. Computer 3b02 may comprise a processor 3b05, a main memory 3b08, a memory controller 3b06, an auxiliary storage interface 3b12c, a general input/output interface 3b12b and a terminal interface 3b12a, all of which are interconnected via a system bus 3b14.

Processor 3b05 may perform computation and control functions of computer system 3b01, and comprises a suitable central processing unit (CPU).

Auxiliary storage interface 3b12c may allow computer system 3b01 to store and retrieve information from auxiliary storage devices, such as magnetic disks (e.g., hard disks or floppy diskettes) or optical storage devices (e.g., CD-ROM). By way of example, one suitable storage device is a direct access storage device (DASD) 3b07.

Memory controller 3b06, through use of a processor, may be responsible for moving requested information from main memory 3b08 and/or through auxiliary storage interface 3b12c to processor 3b05.

Terminal interface 3b12a may allow system administrators and computer programmers to communicate with computer system 3b01, normally through monitor 3b04, keyboard 3b03, mouse, trackball and the like or through programmable workstations.

Input/output interface 3b12b may allow computer system 3b01 via processor 3b05 to communicate with general input/output means 3b09, including a network connection 3b10, for sending and/or receiving data, e.g. for a network connection with one or more further computer systems 3b11, or for sending or receiving of data to or from other parties.

In one embodiment, memory 3b08 includes an operating system, programs and data, particularly a central lock service module 3b20, a generic lock service module 3b13 (generic lock service) each having access to configurable settings 3b18 and to a lock server (not shown). Memory 3b08 further comprises one of a plurality of first processing modules 3b14, 15, each having a central lock service 3b20. The lock service module 3b13 comprises an internal buffer 3b19 for storing information on already locked data objects.

Referring now to FIG. 4, a further embodiment of the invention is illustrated. The embodiment of FIG. 4 comprises a central lock service module 401, a generic lock service 405 and a lock object 406, located in a main memory of a computer system, like the one shown in FIG. 3b. Before accessing one or more data objects in a database, a processing module may pass the names of m key fields 402 of the n data objects to be locked, a table 403 of the values of the key fields for the n data objects to be locked and a number 404 of the maximum number of locks (here k) to the central lock service 401. The central lock service 401 may then, in the course of the process, transfer the data to the generic lock service 405. As a result, the names of the key fields are preferably in an order, which fits to the structure of the database and the data objects to be locked.

After processing the received data, generic lock service 405 generates a lock object 406 having x<=k entries for the n data objects. The entries may comprise values for the x*m key fields that are used to lock the n data objects. If n is smaller or equal than k, a table (lock object) is returned, which comprises the n*m values of the n*m key fields, since the number of data keys does not exceed the possible number of locks and all data objects can be locked with their full key. Otherwise, if n greater than k, wildcards are used to lock several values for one key field at once. To determine where to use the wildcards, the generic lock service 405 may use a heuristic method to optimize the locks. For example, according to such a heuristic method, generic lock service 405 may first collect all values that appear per key field. This may be implemented by means of a table as shown by Table 1:

TABLE 1

Internal table of key field values

| Key Field | Number of different values | Value |
|---|---|---|
| Field 1 | Y1 | Val 1.1 |
| | | ... |
| | | Val 1.y1 |
| ... | ... | ... |
| Field m | Ym | Val m.1 |
| | | ... |
| | | Val m.ym |

In Table 1, the first column contains the names of the key fields 1 to m. The second column contains a number y1 to ym of different values contained in the respective key field. The third column contains the different values val__1.1 to val_m.ym of the key fields 1 to m. Therefore, a field per key field is subdivided into a number of ym sub fields for a field m.

The generic lock service 405 may then loop over the key fields and check, whether the number yi (i->1 to m) of different values is smaller than k. If yes, all the values for this key can be locked, if not, all key values are locked per wildcard. This process continues that way with the next key field considering, that the number of created lock entries is the product of the number of values per key field, which must not exceed k (k<=y1* . . . *ym).

In a further embodiment, Table 1 may be sorted according to ascending or descending values yi before the loop described above is performed.

The following tables show, by way of a non-limiting example, how a lock object could look like. The example consists of a Table 2 defining m=3 key fields 1 to 3, and a Table 3 defining keys of n=18 data objects to be locked and a maximum number of k=10 locks.

TABLE 2

Names of key fields

| Field no | Name |
|---|---|
| 1 | Controlling Area |
| 2 | Activity |
| 3 | Branch |

TABLE 3

Keys of data objects to be locked

| Controlling Area | Activity | Branch |
|---|---|---|
| 1000 | Open Account | A1 |
| 1000 | Open Account | A2 |
| 1000 | Open Account | A3 |
| 1000 | Open Account | A4 |
| 1000 | Open Account | A5 |
| 1000 | Open Account | A6 |
| 1000 | Open Account | A7 |
| 1000 | Open Account | A8 |
| 1000 | Open Account | A9 |
| 1000 | Close Account | A1 |
| 1000 | Close Account | A2 |
| 1000 | Close Account | A3 |
| 1000 | Close Account | A4 |
| 1000 | Close Account | A5 |
| 1000 | Close Account | A6 |
| 1000 | Close Account | A7 |
| 1000 | Close Account | A8 |
| 1000 | Close Account | A9 |

These data are passed to the generic lock service 405 by processing the module via central lock service 401. After receipt, generic lock service 405 creates an internal table (see Table 4) in order to determine a balanced number of locks containing wildcards.

TABLE 4

Internal table of key field values

| Key Field | Number of different values | Value |
|---|---|---|
| Controlling Area | 1 | 1000 |
| Activity | 2 | Open Account |
| | | Close Account |
| Branch | 9 | A1 |
| | | A2 |
| | | A3 |
| | | A4 |
| | | A5 |
| | | A6 |
| | | A7 |
| | | A8 |
| | | A9 |

Generic lock service 405 then checks, whether n is smaller or equal than k. Since this is not the case in the example, generic lock service 405 loops over Table 4 starting with field 1. The number of values for that field is smaller than 10 and, therefore, all values for that field can be locked. Continuing with field 2, generic lock service 405 calculates the maximum number of lock entries for fields 1 and 2, which is 2, what is still smaller than 10 and, therefore, all values for fields 1 and 2 can be locked. Continuing with field 3, the analogous calculation yields a maximum number of 18 lock entries, what is greater than 10 and, therefore, the values for field 3 can not be locked and are replaced by wildcards. Consequently, generic lock service 405 creates a lock object having two entries. This can be seen in Table 5, where the lock object comprises a table with a column for each key field. The values of key fields 1 and 2 are entered in the respective fields, whereas the values of the key field 3 is replaced by a wildcard (*). As a result, the 18 data objects in the database represented by the keys in Table 3, are locked with a lock object having two entries. Thus, the activities open/close account would be locked in controlling area 1000 for all branches. If a second process should try to get access to data objects with those activities and controlling area part in branches B1 to B2, for example, this would not be possible, because the wildcards cover these branches as well.

TABLE 5

Lock object having 2 entries

| Controlling Area | Activity | Branch |
|---|---|---|
| 1000 | Open Account | ** |
| | Close Account | ** |

This situation may be improved, consistent with another embodiment of the invention, by determining common characteristics of different values of a key field and then entering the determined common characteristics together with a wildcard into the key fields. This is now explained in more detail by way of continuation of the preceding example.

When checking for common characteristics of the values of the key field 3, for example, generic lock service 405 finds that the character 'A' is a common characteristic of all values of key field 3. This character can now be combined with a wildcard and the combination can be entered in state of the mere wildcard into the fields of key field 3. The result is shown in Table 6.

Now, a second process could have access to those activities in the branches B1 to B9 at the same time.

TABLE 6

Lock object having 2 complete entries in the first 2 key fields and a common characteristic together with a wildcard in the remaining key field

| Controlling Area | Activity | Branch |
|---|---|---|
| 1000 | Open Account | A* |
| | Close Account | A* |

Referring now to FIG. 5, another method consistent with an embodiment of the invention is illustrated by way of a flow diagram, which summarizes processing steps of an example of a generic lock service. After a starting step 501, the generic lock service receives data from a data processing module 503 via a central lock service module in step 502. The data may comprise m field names, m*n values of key fields for the n data objects to be locked and a maximum number of k lock entries. The generic lock service then determines in a step 504 an optimized number of x<=k lock entries, for example by creating and evaluating an internal table like Table 4 described before. The generic lock service then determines in a step 505 whether values or wildcards are entered into the fields of the x entries of a lock object 507 to be created in step 506. The process then returns to step 502 and waits for a new lock request or ends in a step 508.

Modifications and adaptations of the present invention will be apparent to those skilled in the art from consideration of the specification and practice of the embodiments of the invention disclosed herein. The foregoing description has been presented for purposes of illustration and description. It is not exhaustive and does not limit the invention to the precise forms disclosed. Modifications and variations are possible in light of the above teachings or may be acquired from the practicing of embodiments of the invention. For example, the disclosed implementations comprise software, but systems and methods consistent with the present invention may be implemented as a combination of hardware and software or in hardware alone. Additionally, although certain aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be Integrated in existing e-mail or browser software.

While illustrative embodiments of the invention have been described herein, the present invention is not limited to the various embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed:

1. A computer-implemented method for processing data objects in a database of a computer system, the method comprising steps performed by a computer of:

receiving, by a processor, a request from one of a plurality of data processing modules to set one or more logical locks for one or more data objects to limit access to the data objects;

automatically selecting, by the processor, a single record locking process or a generic range locking process for setting the logical locks, wherein if the single record locking process is used, the processor:

queries an internal buffer, in which logical locks on single locked data objects are stored, to determine whether the data objects are already logically locked, and sets logical locks on the data objects which are not yet logically locked in the internal buffer; and wherein if the generic range locking process is used, the processor attempts to set logical range locks on the data objects;

receiving names of one or more key fields of the one or more data objects to be locked;

receiving values for each of the one or more key fields of the one or data objects to be locked;

receiving a maximum number of logical locks for the one or more data objects to be locked;

determining, by the processor, whether the number of data objects to be locked is less than or equal to the maximum number of logical locks and (i) when the number of data objects to be locked is less than or equal to the maximum number of logical locks, creating one or more lock objects comprising the names of the one or more key fields of the one or more data objects to be locked and the values for each of the one or more key fields of the one or more data objects to be locked, and (ii) when the number of data objects to be locked is not less than or equal to the maximum number of logical locks, querying the values for each of the one or more key fields of the one or data objects to be locked;

determining a number of different values of each of the one or more key fields;

looping through each of the one or more key fields to calculate a number of lock entries for the one or more key fields, where the number of lock entries for the each of the one or more key fields is calculated based on a product of the number of different values of the one or more key fields starting with the first of the key fields up to the each of the one or more key fields; and creating one or more lock objects comprising the names of the one or more key fields and the values for the one or more key fields when the number of lock entries is less than or equal to the maximum number of logical locks, and comprising wildcards for at least some of the one or more key fields when the number of lock entries is greater than the maximum number of locks;

sending, by the processor, a message concerning the success or failure of logically locking the data objects; and processing, by the processor, the successfully logically locked data objects, such that when updating the data objects in the database, the data objects are locked in the database by a database management system.

2. The method of claim 1, further comprising:

after receiving a request and before selecting between the single record locking process and the generic range locking process, the following steps:

automatically selecting, by the processor, whether (i) the data objects are to be logically locked when changes of the data objects are requested, or (ii) the data objects are to be logically locked when the first or each further data processing module is started, or (iii) the data objects are not to be logically locked and skipping the selecting between the single record locking process and the generic range locking process and processing the data objects by means of the database management system, which performs the locking of the data objects in the database when updating the data in the database.

3. The method of claim 2, further comprising:

sending messages, with the database management system, to indicate the success or failure of locking the data objects in the database.

4. The method of claim 2, wherein the selecting steps are made by querying configurable settings, the settings being configurable per application or per user.

5. A computer system comprising:
a memory comprising program instructions;
input means for receiving and entering data;
output means for sending and presenting data storage means for storing data;
a database management system comprising a lock mechanism for locking data objects in a database;
a processor responsive to the program instructions, the program instructions causing the processor to execute steps of:
  receiving a request from one of a plurality of data processing modules to set one or more logical locks for one or more data objects to limit access to the data objects;
  automatically selecting a single record locking process or a generic range locking process for setting the logical locks, wherein if the single record locking process is used:
    querying an internal buffer, in which logical locks on single locked data objects are stored, to determine whether the data objects are already logically locked, and
    setting logical locks on the data objects which are not yet logically locked in the internal buffer; and
    wherein if the generic range locking process is used, attempting to set logical range locks on the data objects;
  receiving names of one or more key fields of the one or more data objects to be locked;
  receiving values for each of the one or more key fields of the one or data objects to be locked;
  receiving a maximum number of logical locks for the one or more data objects to be locked;
  determining whether the number of data objects to be locked is less than or equal to the maximum number of logical locks and
    (i) when the number of data objects to be locked is less than or equal to the maximum number of logical locks, creating one or more lock objects comprising the names of the one or more key fields of the one or more data objects to be locked and the values for each of the one or more key fields of the one or more data objects to be locked, and
    (ii) when the number of data objects to be locked is not less than or equal to the maximum number of logical locks,
      querying the values for each of the one or more key fields of the one or data objects to be locked;
      determining a number of different values of each of the one or more key fields;
      looping through each of the one or more key fields to calculate a number of lock entries for the one or more key fields, where the number of lock entries for the each of the one or more key fields is calculated based on a product of the number of different values of the one or more key fields starting with the first of the key fields up to the each of the one or more key field; and
      creating one or more lock objects comprising the names of the one or more key fields and the values for the one or more key fields when the number of lock entries is less than or equal to the maximum number of logical locks, and comprising wildcards for at least some of the one or more key fields when the number of lock entries is greater than the maximum number of locks;
  sending a message concerning the success or failure of logically locking the data objects; and
  processing the successfully logically locked data objects, such that when updating the data objects in the database, the data objects are locked in the database by the database management system.

6. A computer readable storage medium comprising program instructions for processing data objects within a computer system, the program instructions comprising instructions for performing a method executed by a processor, the program instructions causing the processor to execute steps of:
  receiving a request from one of a plurality of data processing modules to set one or more logical locks for one or more data objects to limit access to the data objects;
  automatically selecting a single record locking process or a generic range locking process for setting the logical locks, wherein if the single record locking process is used:
    querying an internal buffer, in which logical locks on single locked data objects are stored, to determine whether the data objects are already logically locked, and
    setting logical locks on the data objects which are not yet logically locked in the internal buffer; and
    wherein if the generic range locking process is used, attempting to set logical range locks on the data objects;
  receiving names of one or more key fields of the one or more data objects to be locked;
  receiving values for each of the one or more key fields of the one or data objects to be locked;
  receiving a maximum number of logical locks for the one or more data objects to be locked;
  determining whether the number of data objects to be locked is less than or equal to the maximum number of logical locks and
    (i) when the number of data objects to be locked is less than or equal to the maximum number of logical locks, creating one or more lock objects comprising the names of the one or more key fields of the one or more data objects to be locked and the values for each of the one or more key fields of the one or more data objects to be locked, and
    (ii) when the number of data objects to be locked is not less than or equal to the maximum number of logical locks,
      querying the values for each of the one or more key fields of the one or data objects to be locked;
      determining a number of different values of each of the one or more key fields;
      looping through each of the one or more key fields to calculate a number of lock entries for the one or more key fields, where the number of lock entries for the each of the one or more key fields is calculated based on a product of the number of different values of the one or more key fields starting with the first of the key fields up to the each of the one or more key fields; and
      creating one or more lock objects comprising the names of the one or more key fields and the values for the one or more key fields when the number of lock entries is less than or equal to the maximum number of logical locks, and comprising wildcards for at least some of the one or more key fields when the number of lock entries is greater than the maximum number of locks;

sending a message concerning the success or failure of logically locking the data objects; and processing the successfully logically locked data objects, such that when updating the data objects in the database, the data objects are locked in the database by the database management system.

* * * * *

UNITED STATES PATENT AND TRADEMARK OFFICE
CERTIFICATE OF CORRECTION

PATENT NO. : 7,644,084 B2
APPLICATION NO. : 11/292117
DATED : January 5, 2010
INVENTOR(S) : Roman Rapp It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this

Sixteenth Day of November, 2010

David J. Kappos
*Director of the United States Patent and Trademark Office*